March 2, 1937.  R. R. BUTTS  2,072,082
LIQUID COOLER
Filed Feb. 27, 1936  3 Sheets-Sheet 2
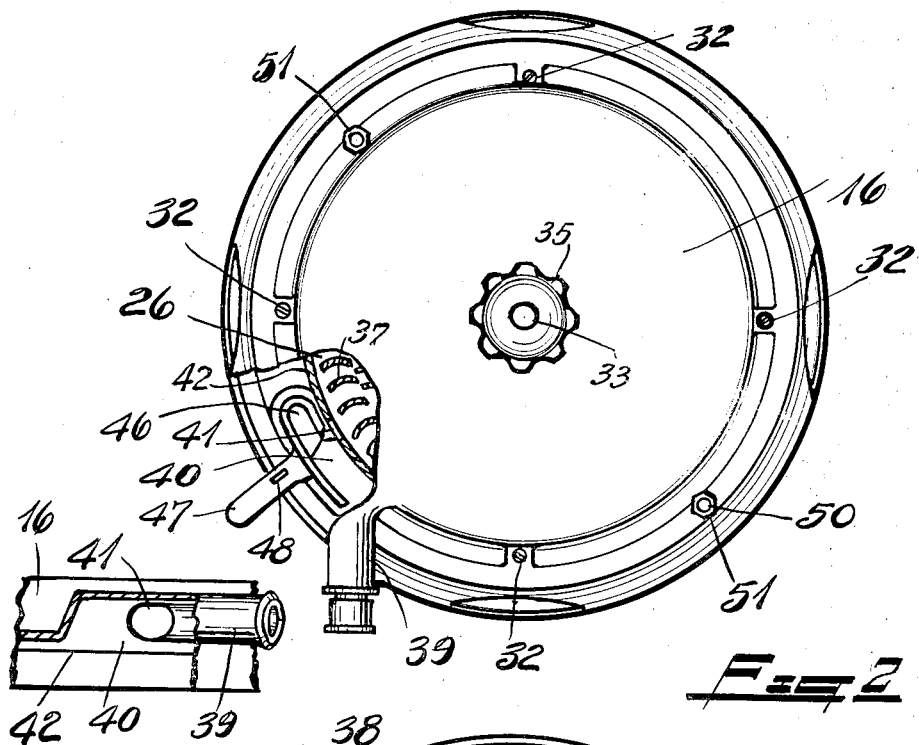
Fig. 2
Fig. 4
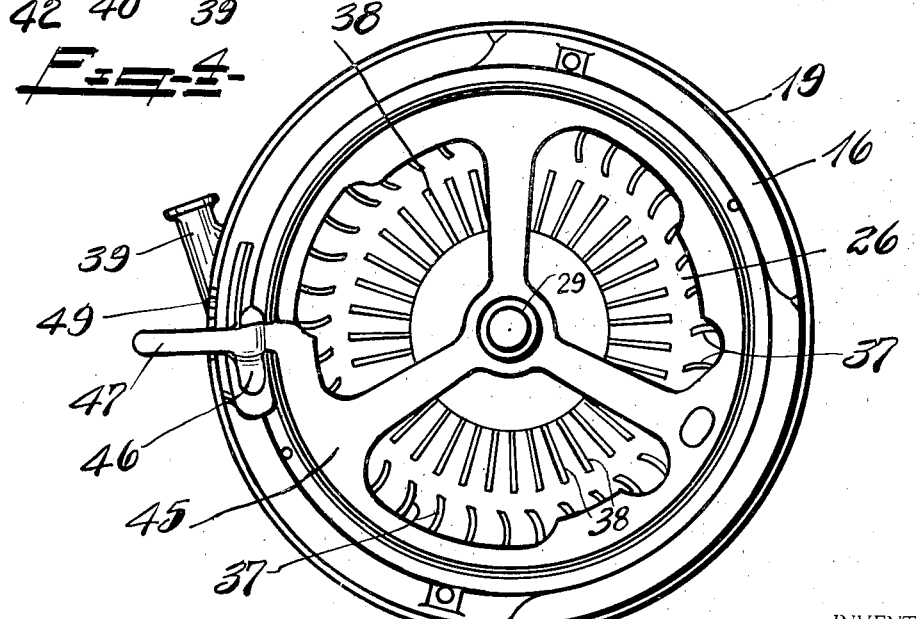
Fig. 3
INVENTOR.
Richard R. Butts,
BY Frank C. Fearman,
ATTORNEY.

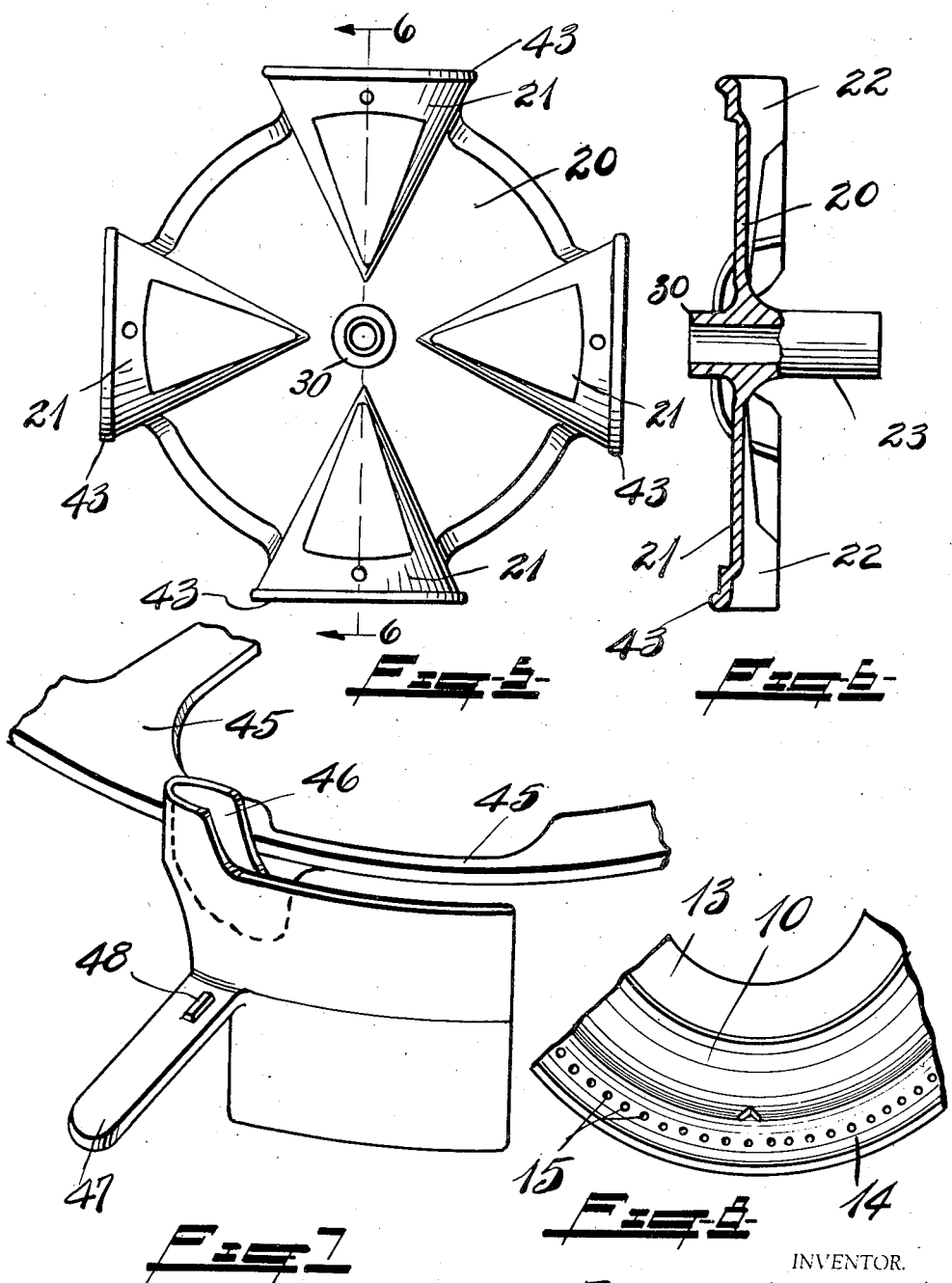

Patented Mar. 2, 1937

2,072,082

UNITED STATES PATENT OFFICE 2,072,082

LIQUID COOLER

Richard R. Butts, Saginaw, Mich., assignor to Hargett-Butts Corporation, Richville, Mich., a corporation of Michigan Application February 27, 1936, Serial No. 66,026

8 Claims. (Cl. 257—103)

This invention relates to liquid coolers and more particularly to a liquid cooler which can be removably mounted on a can or container, and which when actuated will effectively cool and aerate the contents of said container.

Another object is to design a hydraulically operated cooling device which sprays and diffuses the cooling liquid on the side walls of the container, which effectively agitates and aerates the liquid during the cooling process, so that when the device is used for cooling milk, the animal odors and heat will be carried from the can as the milk is agitated and cooled.

A further object is to provide a cooling device of simple construction, which is light in weight so that it can be conveniently handled, changed from can to can, or hung on a suitable hook when cleaned and not in use.

A still further object is to provide means for regulating the volume of water or other cooling agent flowing through the device, and which also regulates the speed of the aerating means.

A further object still is to design a cooling device which can be utilized with a conventional shipping can, without the necessity of altering the can, and which is self-centering, requiring no fitting or adapting appliance to insure proper operation or mounting.

With the above and other objects in view, the present invention consists in the combination and arrangement of parts, hereinafter more fully described, illustrated in the accompanying drawings, and particularly pointed out in the appended claims, it being understood that changes may be made in the form, size, proportion, and minor details of construction, without departing from the spirit, or sacrificing any of the advantages of the invention.

In the drawings—

Fig. 2 is a top plan view, the cover being broken away to show the impeller and liquid control.

Fig. 3 is an inverted plan view of the cover section, impeller, and water regulator.

Fig. 4 is a fragmentary sectional side elevation showing the liquid chamber and port.

Fig. 5 is a plan view of the water table.

Fig. 6 is a transverse sectional view taken on the line 6—6 of Fig. 5 and looking in the direction of the arrows.

Fig. 7 is an enlarged fragmentary perspective view of the liquid regulator.

Fig. 8 is a fragmentary plan view of the frame.

Figure 1:
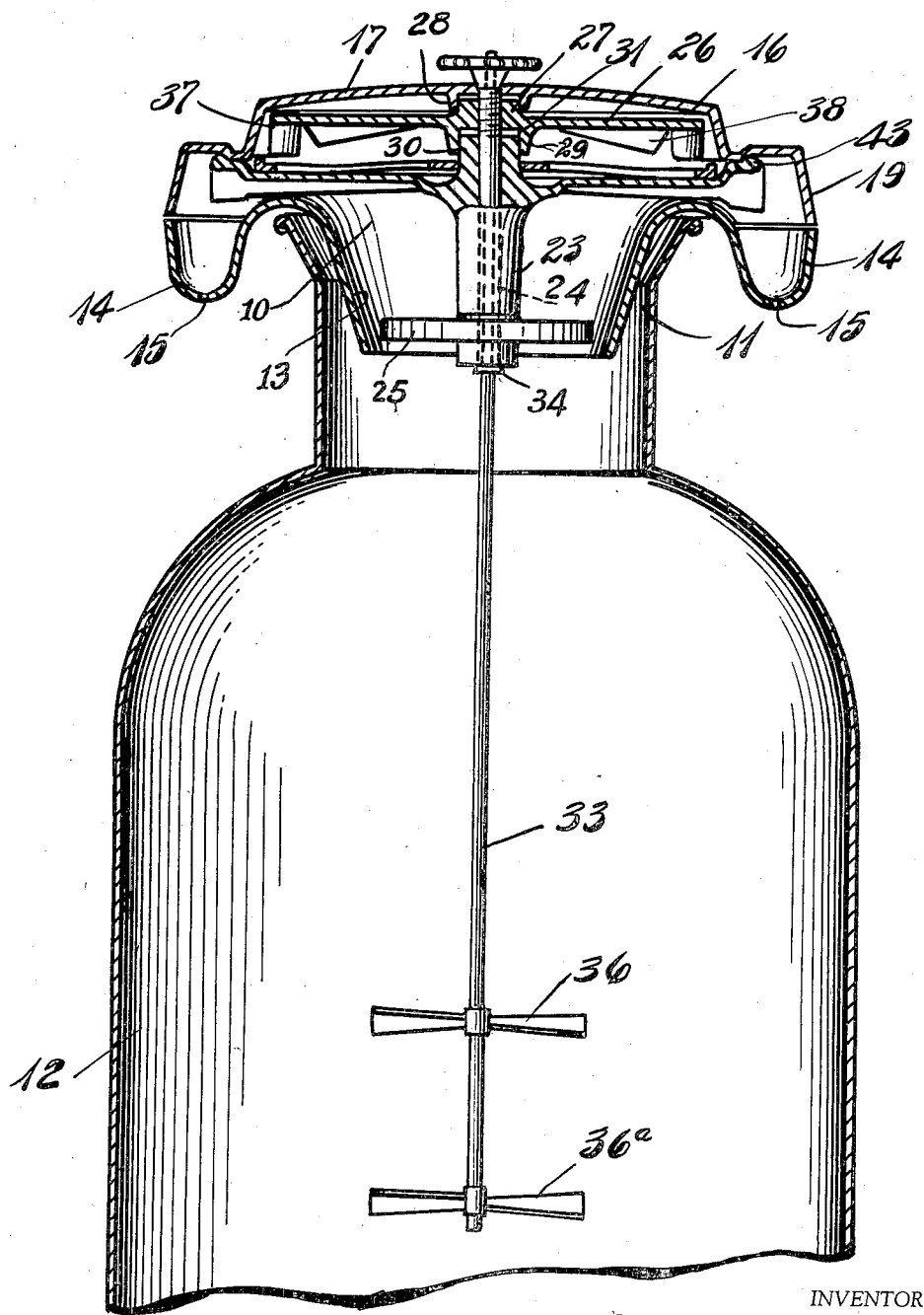
Fig. 1 is a vertical sectional view showing my improved cooling device in position on a milk can.

Referring now more specifically to the drawings in which I have shown the preferred embodiment of my invention, the numeral 10 indicates a circular frame, either pressed or cast, and which is adapted to be mounted on the neck 11 of a conventional can 12, this frame being formed as clearly shown in Figs. 1 and 4 of the drawings, the centrally disposed conical neck portion 13 extending into the neck of the can, while the outer marginal portion or rim is rolled to form a trough 14 in which a plurality of openings 15 are provided to diffuse and permit the water or other cooling agent to spray onto the side walls of the can.

A cover section 16 is secured to and forms the upper portion of the frame, the center portion 17 being cylindrical in shape and is adapted to form a housing and closure for the operating parts of the device, the outer marginal edge or rim 19 extending downwardly and abutting the upper edge of the trough 14.

A water table 20 is mounted on the frame 10 and is provided with spaced apart, radially disposed, raised sections 21, forming vents or passages 22 which permits air to be exhausted from the container, the surface between the raised sections being pitched downwardly, and the edges being curved so that liquid freely drains.

An elongated hub 23 is formed on the lower face of the water table, and a hollow fan shaft 24 is journaled therein, a fan 25 being mounted on the lower end of said shaft, and an impeller 26 is mounted on the upper end of said shaft, this upper end being threaded and engaging the threaded section of the impeller hub 27, said hub being centered in a circular rim 28 provided on the inner face of the cover section.

A counterbored hub 29 is provided on the lower face of the impeller and is adapted to accommodate and receive the raised hub 30 provided on the face of the water table, a thrust washer 31 being interposed as usual, and screws 32 serve to secure the cover section to the water table.

An agitator shaft 33 projects through the hollow fan shaft 24, and a conical shaped shoulder 34 is provided intermediate the length thereof, said shoulder engaging the end of the hollow shaft 24, the upper end of the shaft being threaded, and a nut 35 is threaded on the end thereof to secure the various parts in assembled relation. Agitators 36 and 36ª are provided on the lower section of the shaft and serve to agitate the milk or other liquid to aerate and assist in the cooling operation.

A plurality of slightly curved depending blades 37 are provided on the outer edge of the bottom face of the impeller, and spaced apart ribs 38 aid to properly distribute the cooling agent which serves the dual purpose of driving the impeller and cooling the milk.

An angularly disposed nozzle 39 is formed integral with and projects from the side wall of the cover section, and a chamber 40 is provided in said section, a port or opening 41 being provided in the rim 42 and opens into the interior of the cooler so that the incoming water strikes against the blades 37 and serves to drive the impeller, the water being disturbed by the ribs 38, these falling onto the face of the water table 20, and thence draining into the trough section 14 of the cooler from which it sprays through the openings 15 onto the side walls of the can. The shaft 33 is driven with the impeller; thus the agitators 36 and 36$^a$ agitate the liquid in the can while the fan 25 serves to draw the heat and animal odors upwardly and exhausts them in a manner to be presently described.

The raised sections 21 of the water table prevent water from entering the can, the liquid flowing off said table and into the trough 14, the ends of the raised sections being curved as at 43, and the inner surface of the cover section is shaped to conform thereto, making a leakproof joint, and it will, therefore, be obvious that these raised sections form spaced apart vents which when the cooler is assembled, permit air to be exhausted from the can, these vents being in direct alignment with the openings 14 provided in the side wall of the cover section.

Oftimes it is desirable to regulate the speed of the impeller without restricting the volume of cooling fluid flowing through the cooler, and this I accomplish by means of a control spider 45; this spider is mounted on the hub 30, and a trough shaped member 46 is formed on the outer edge thereof (see Fig. 7), a handle 47 projecting from said member, and a tooth 48 is cast integral therewith and is adapted to engage notches or teeth 49 formed in the rim of the frame, and it will be obvious that rotation of the spider member will control and regulate the volume of water admitted to the impeller, the diverted portion dropping down into the trough 14 so that no sacrifice of volume is necessary to regulate the speed of the impeller, the engagement of the teeth holding the control spider in its adjusted position.

Vertically disposed bolts 50 are anchored in the trough section 14 and project through suitable openings (not shown) in the cover section, nuts 51 serving to tighten and secure the parts in assembled relation.

In practice the cooler is placed on a can, with the agitators 36 and 36$^a$ extending into the milk. The nozzle 39 is then connected to a suitable source of water supply, and when the water strikes the blades 37 of the impeller, rotation will be imparted thereto, the agitators agitating the milk while the fan 25 draws the odors from the can. The water from the impeller falls onto the water table and flows outwardly and into the trough 14, and thence sprays onto the side walls of the can.

The device is simple and practical in operation, it is light in weight, can be readily disassembled and cleaned, and is efficient in operation; no water can enter the can, and the agitation of the liquid in the can thoroughly aerates, as well as assisting in the rapid and uniform cooling of the can contents.

From the foregoing description it will be obvious that I have perfected a simple, practical, substantial, and efficient cooling device which can be economically manufactured, and which is easy to assemble and operate.

What I claim is:

1. A liquid cooler comprising a frame adapted to be mounted on a container and formed with a circular trough section, having a plurality of discharge openings therein, a cover section mounted thereon, a hydraulically actuated impeller, means for distributing and discharging the liquid from the impeller into said trough, and means operable with said impeller for agitating and aerating the liquid in the container.

2. A liquid cooler comprising a frame formed with a trough shaped liquid diffusing rim section, a cover section mounted thereon, a liquid diffusion impeller in said cover section, a water table mounted on the frame for directing and distributing the liquid from the impeller into said trough shaped rim for discharge onto the side walls of the container, a centrally disposed shaft, and agitating and aerating means mounted thereon and adapted to be driven by said impeller for agitating, cooling and aerating the liquid in the container.

3. A liquid cooler including a frame formed with a marginal trough shaped perforated rim and adapted to be mounted on a container, a cover section mounted on the frame and provided with a liquid intake nozzle, a water table secured to the cover section, openings in the frame adjacent the rim of said water table, an impeller mounted thereon and including an exhaust fan, means for driving said impeller and fan, and manually operable means for regulating the volume of water admitted to the impeller.

4. A liquid cooler including a frame adapted to be mounted on a container and formed with a trough shaped rim having a plurality of perforations therein, a water table mounted on the frame and formed with a plurality of radially disposed raised sections forming vents between the frame and said table, a fan shaft journaled in said water table, a fan, liquid operable means mounted on the shaft and interposed between the cover section and the said water table and adapted for exhausting the air from above said container, and means for supplying liquid to said liquid operable means.

5. A liquid cooler of the class described and including a frame adapted to be removably mounted on a container and formed with a liquid diffusing rim section adapted for spreading liquid and cooling the exterior of the container, a water table mounted on the frame and formed with radiating raised sections, a fan shaft journaled in said water table and a liquid operable means mounted on the upper end thereof, a fan on the lower end, a cover section secured to said water table and formed with openings therein in alignment with the raised sections of the water table, and means for supplying liquid to said liquid operable means and liquid diffusing rim section.

6. A liquid cooler of the class described and including a frame adapted to be removably mounted on a container and formed with a liquid diffusing rim section, a water table mounted on said frame, a fan shaft journaled therein and an impeller mounted on said shaft above said table, a fan on the opposite end of the shaft, a cover section mounted on and secured to the frame, means for supplying liquid to said impeller, a shaft extending through said fan shaft, agitators mounted thereon, said shaft being adapted to be driven by said impeller, and vents formed in said water table to permit air being exhausted from the container.

7. A liquid cooler of the character described and including a frame adapted to be mounted on a container and formed with a marginal trough shaped liquid diffusing rim adapted for spreading a liquid and directing it onto the side walls of the container, a water table mounted on the frame and formed with radiating raised sections forming vents between the frame and table, a fan shaft journaled in said table, a rotor mounted on the upper end thereof, a fan mounted on the lower end, a cover section mounted on the frame and provided with a liquid intake nozzle for supplying liquid to the rotor, means for regulating the liquid admitted to the impeller, a shaft mounted in said fan shaft, and means on said shaft for agitating the liquid simultaneously with the aerating and cooling thereof.

8. A liquid cooler of the character described and including a frame adapted to be mounted on a container and formed with a perforated trough shaped rim adapted to diffuse a liquid onto the side walls of the container, a water table mounted on the frame and provided with spaced radiating sections forming vents, a hollow fan shaft, an impeller mounted thereon above the water table, a fan on the lower end thereof, a cover section mounted on the frame, and formed with a downwardly projecting rim, a port in said rim, a liquid chamber in said cover section and a nozzle connected thereto, means for connecting a liquid supply to said nozzle and means for controlling the area of said port opening, a shaft mounted in the fan shaft and projecting through the cover section, and agitators on the lower end thereof whereby a liquid in the container will be agitated, aerated and cooled when the impeller is driven.

RICHARD R. BUTTS.